(12) United States Patent
Lopez Tonazzi et al.

(10) Patent No.: US 6,203,304 B1
(45) Date of Patent: Mar. 20, 2001

(54) APPARATUS FOR FILLING THE CAVITIES OF CELLS AND LAMINATED SUBSTRATES WITH A FLUID

(75) Inventors: Juan C. Lopez Tonazzi; Joseph E. Kucharczyk, Jr.; Anoop Agrawal, all of Tucson, AZ (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/219,900

(22) Filed: Dec. 24, 1998

Related U.S. Application Data

(62) Division of application No. 08/831,646, filed on Apr. 9, 1997, now Pat. No. 5,856,211.
(60) Provisional application No. 60/015,224, filed on Apr. 10, 1996.

(51) Int. Cl.$^7$ .................................................. B29C 39/12
(52) U.S. Cl. ........................................ 425/110; 425/405.1
(58) Field of Search .................................. 425/405.1, 110

(56) References Cited

U.S. PATENT DOCUMENTS

| | | | |
|---|---|---|---|
| 2,064,514 | * 12/1936 | Balz | 425/110 |
| 3,579,738 | * 5/1971 | Beattie | 425/405.1 |
| 3,689,022 | * 9/1972 | Rossetti | 425/405.1 |
| 3,694,129 | * 9/1972 | Daddona | 425/405.1 |
| 4,439,392 | * 3/1984 | Schutzler et al. | 425/405.1 |
| 4,626,454 | * 12/1986 | Sandman | 425/110 |
| 4,684,219 | 8/1987 | Cox et al. | 349/154 |
| 4,761,061 | 8/1988 | Nishiyama et al. | 359/265 |
| 5,076,673 | 12/1991 | Lynam et al. | 359/271 |
| 5,142,407 | 8/1992 | Varaprasad et al. | 359/276 |
| 5,151,816 | 9/1992 | Varaprasad et al. | 359/275 |
| 5,244,557 | 9/1993 | Defendini et al. | 204/192.29 |
| 5,268,049 | 12/1993 | Marriott et al. | 156/99 |
| 5,288,423 | 2/1994 | Behan et al. | 252/174.11 |

FOREIGN PATENT DOCUMENTS

0612826A1  8/1994  (EP).

OTHER PUBLICATIONS

Encyclopedia of Polymer Science & Engineering, "Injection Molding", vol. 8 p. 102, 2 ed. John Wiley & Son, New York (1987), Mark H.F. et al.

Eshback, Handbook of Engineering Fundamentals, John Wiley and Sons, pp. 8–15 (1952).

* cited by examiner

*Primary Examiner*—Robert Davis
(74) *Attorney, Agent, or Firm*—Fitzpatrick, Cella, Harper & Scinto

(57) ABSTRACT

A method and apparatus are disclosed for filling a cell cavity positioned between a first substrate and a second substrate with a cell filling liquid. The method entails forming at least one evacuation cavity encompassing at least a portion of an outer surface of each of the first and second substrates of a cell containing a cell cavity and isolating the cell cavity from the evacuation cavity; reducing a pressure in each of the evacuation cavity and the cell cavity; and dispensing the cell filling fluid into the cell cavity.

16 Claims, 13 Drawing Sheets

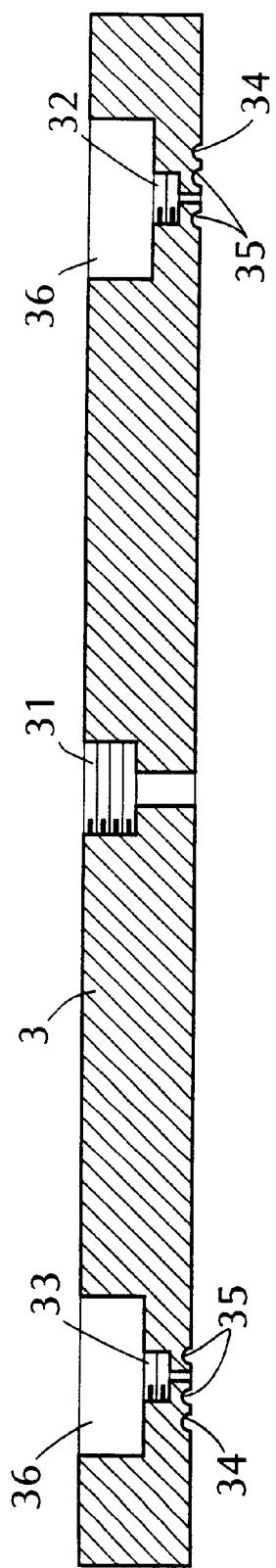
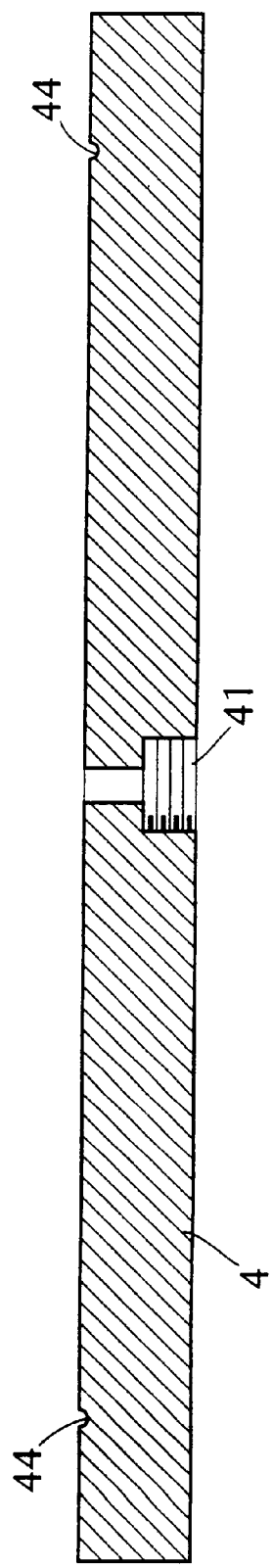

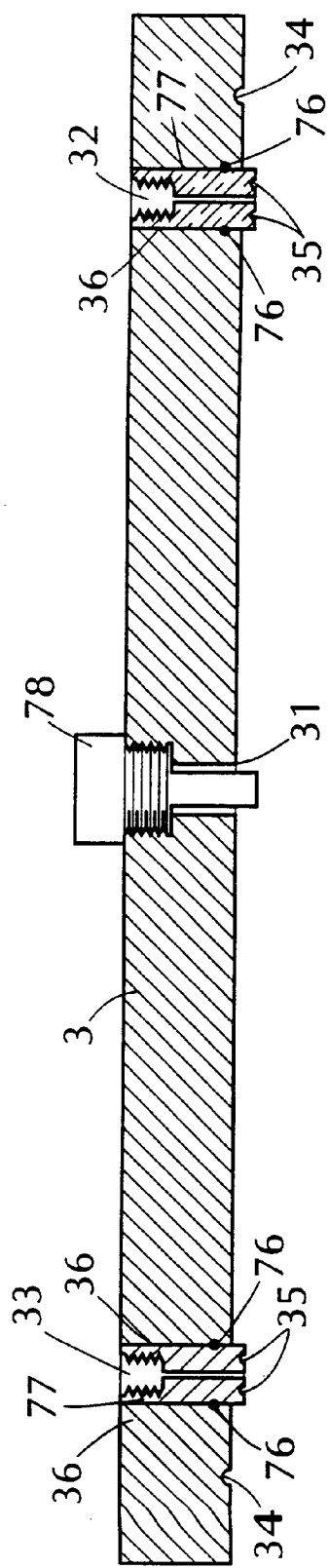
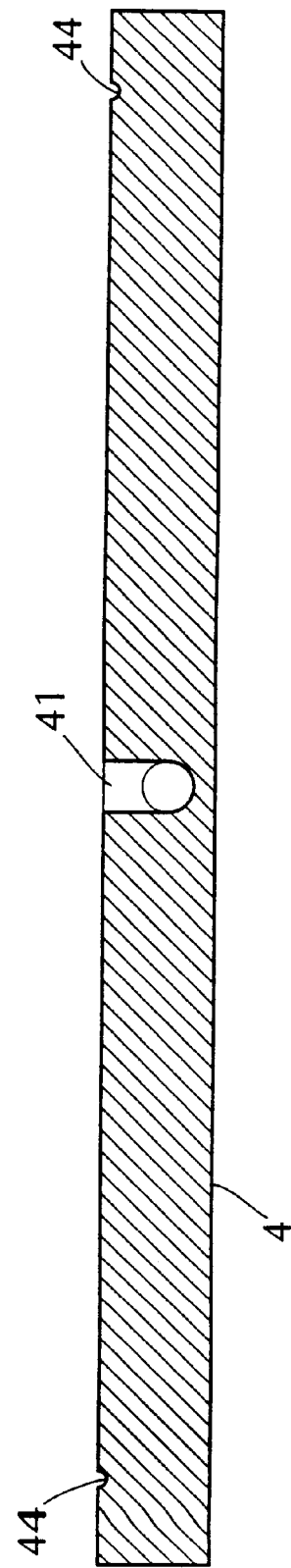

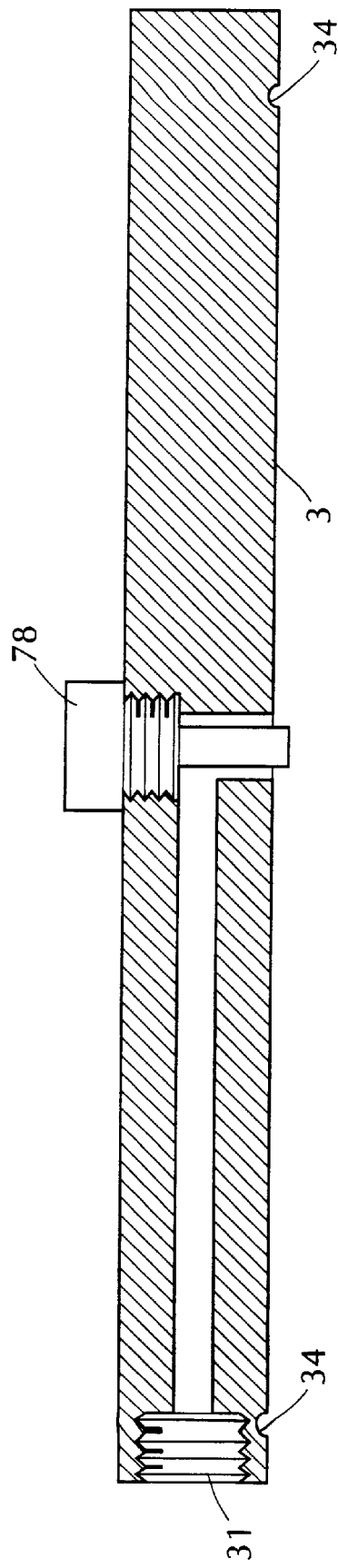
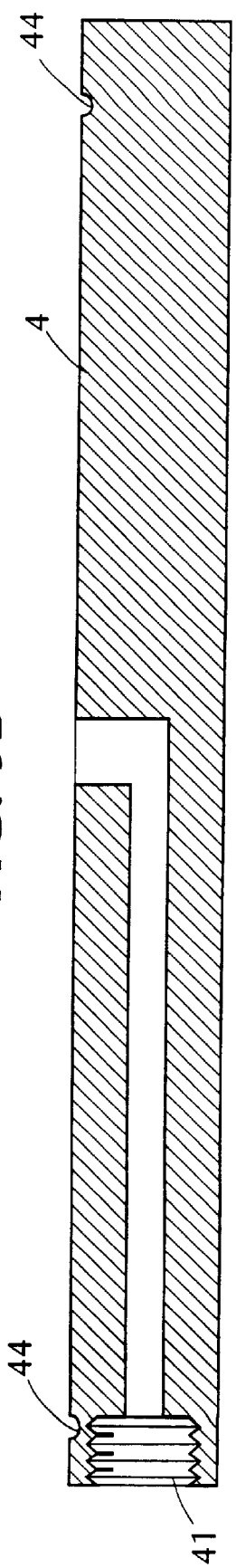

APPARATUS FOR FILLING THE CAVITIES OF CELLS AND LAMINATED SUBSTRATES WITH A FLUID

This application is a divisional of U.S. application Ser. No. 08/831,646, filed Apr. 9, 1997, and now U.S. Pat. No. 5,856,211 which claims the benefit of U.S. Provisional Application No. 60/015,224, filed Apr. 10, 1996.

This invention was made with government support under grant No. DE-FC36-95G010069 awarded by the Department of Energy. The United States government has certain rights in the invention.

BACKGROUND OF THE INVENTION

1. Field of the Invention

The present invention relates to an apparatus for filling a cavity of a cell or laminated substrates with a fluid. The invention also relates to a method for filling the cavities of such cells or laminated plates with a fluid. After filling, if desired, a liquid may be converted into a solid. The method and apparatus are particularly suitable for making large area laminated glazings including electrochromic devices.

2. Description of the Prior Art

Laminated glass and cells that contain a liquid or a solid are well known. For example, some architectural and automotive laminate windows are fabricated from a pair of glass substrates and a solid film. The film is sandwiched between the two substrates and then subjected to a cycle of controlled heat and pressure (or vacuum) in an autoclave. This causes all the air to be expelled with a simultaneous softening and/or melting of the film that bonds to the substrates. When the cooled parts are removed from the autoclave an integral laminated unit is obtained. It is also known to seal the edges of the unit to protect the interior of the laminate from atmospheric elements. This method is well suited for self supporting films that can be handled in ambient atmosphere. However, if the materials for forming the interior of the laminate are sensitive to the ambient conditions or are tacky and not self supporting during handling then such a method may be impractical, particularly for commercial high-volume fabrication.

Various methods exist for filling the cavity of a cell or laminate with a liquid. For example, U.S. Pat. No. 5,151,816 discloses first preparing an empty cell using two substrates by sealing them at the periphery. A narrow interpane gap is obtained by adding a spacer to the adhesive used for the sealing operation or by employing a tape or a shim of a pre-determined thickness. Next, a liquid resin is introduced into the cell through a hole left in the seal or through a hole in one of the substrates. The air displaced due to the resin introduction is evacuated through another hole in the substrate or the seal by, for example, creating a suction with a syringe. However, this method is difficult to use if the liquid is being introduced to a large area cavity.

The use of air permeable but fluid impermeable seals through which the air is evacuated during the filling process is disclosed by U.S. Pat. No. 5,268,049. After the cavity is filled, all the holes are plugged and the liquid is converted into a solid. This method using air permeable seals, however, is not suitable for air sensitive materials.

The above-described methods of filling a cell cavity with a liquid, i.e., the two hole method or the method employing permeable seals, suffer from difficulties if the cavity to be filled is a large area. For example if the pressure on the liquid is increased to keep the filling process at a desired rate, the substrates or plates may bow and the force on the cell can lead to seal or plate failure. In addition, if a vacuum is applied to assist pulling the liquid through the cell, then the cell walls are likely to collapse inwards under the ambient pressure and thus restrict the flow of the liquid.

U.S. Pat. No. 5,142,407 discloses a method for filling a cell with a liquid using a technique described as vacuum backfilling. This method has been successfully used for filling smaller cavities in preparation of electrochromic devices. First, an empty cell having two substrates aligned with each other and separated by a seal having a small hole is fabricated. The cell along with the liquid to be filled is placed in a chamber. The chamber is evacuated and then the cell is lowered into the liquid so that the hole is immersed below the liquid meniscus. The vacuum is then released to a pressure p (e.g., atmospheric pressure).

The pressure P on the liquid forces it to fill the evacuated cell cavity. After filling, the cell hole is capped.

The success of vacuum backfilling depends on the pressure, the vacuum to which the cell was subjected to, vapor pressure of the liquid to be filled, the dimensions (thickness and size) of the cell cavity and the surface tension forces between the inner walls of the cell and the liquid. Using vacuum backfilling, the cell cannot be subjected to any arbitrary high vacuum, because the vacuum limit is determined by the vapor pressure of the liquid in the chamber. Thus, in order to successfully fill the cavity using this method, the use of low vapor pressure liquids are preferred. A relationship between the residual bubble size with the vapor pressure of the liquid and the cell size can be calculated. In addition, with increased cell size the size of chamber increases and the time for evacuation will increase both within the cell and in the chamber. For high surface tension liquids, pressure p will limit the extent of filling due to the gravitational forces. Therefore, vacuum backfilling is not a favorable process for filling large cell sizes such as typical automotive windows and architectural glazings.

It is also known that a liquid in the cavity of a cell may be solidified as disclosed in European Patent Application Publication No. 0612826A1. The typical solidification process is carried out by a thermally or radiatively induced polymerization process.

A method and apparatus for filling the cavities of larger area cells and laminates with a fluid that overcomes the above-mentioned difficulties would be highly desirable.

SUMMARY OF THE INVENTION

This invention relates to a method for filling a cell cavity positioned between a first substrate and a second substrate with a cell filling liquid. The method comprises the steps of: (a) forming at least one evacuation cavity encompassing at least a portion of an outer surface of each of the first and second substrates of a cell containing the cell cavity and isolating the cell cavity from the evacuation cavity; (b) reducing a pressure in the evacuation cavity and the cell cavity; and (c) dispensing the cell filling fluid into the cell cavity. The evacuation cavity formed in the method of this invention may include one or more evacuation cavities so as long as the evacuation cavities are isolated from the cell cavity. The cell cavity is isolated from the evacuation cavity to prevent the cell filling fluid from entering the evacuation cavity upon filling the cell cavity.

A preferred embodiment of the method for filling a cell cavity comprises the steps of: (a) forming a first evacuation cavity having as a portion of a boundary thereto at least a portion of an outer surface of the first substrate; (b) forming a second evacuation cavity having as a portion of a boundary thereto at least a portion of an outer surface of the second substrate; (c) reducing a pressure in each of (i) the cell cavity, (ii) the first evacuation cavity, and (iii) the second evacuation cavity; and (d) dispensing the cell filling fluid into the cell cavity. The cell cavity is isolated from the first and second evacuation cavities. Preferably the cell filling fluid is a liquid. A cell filling liquid may also be solidified after filling. The method may further comprise raising the temperature of the cell to enhance the flow of the fluid. For more viscous fluids, the filling fluid itself may be heated to decrease its viscosity. It is also possible to increase the pressure on the filling fluid to reduce the filling time. If the filling fluid pressure causes an outward bowing of the cell walls, the method of this invention further comprises the step of increasing the pressure in the first evacuation cavity and the second evacuation cavity by releasing the vacuum in those cavities and, if necessary, pressurizing the first and second evacuation cavities. The method of this invention advantageously provides a means for filling the cell cavity of large area cells and laminated glazings, including electrochromic devices, with excellent results.

Yet another embodiment of this invention is a method for filling a cell cavity positioned between a first substrate and a second substrate with a cell filling fluid, said method comprising the steps of: (a) aligning a first support member against at least a portion of an outer surface of said second substrate; (b) aligning a second support member against at least a portion of an outer surface of said second substrate; and (c) dispensing the cell filling fluid into said cell cavity while said first support member and said second support member maintain a pressure against said respective first substrate and said second substrate. In this embodiment no evacuation cavity is necessary. In addition, the cell filling fluid is preferably dispensed into the cell cavity under a desired pressure while the support members assert an effective pressure against the respective substrates to maintain the integrity of the cell cavity.

This invention also relates to an apparatus for filling a cell cavity positioned between a first substrate and a second substrate with a cell filling fluid. The apparatus includes at least two mold members for forming at least one evacuation cavity encompassing at least a portion of an outer surface of each of the first substrate and the second substrate of a cell containing the cell cavity. Significantly, the cell cavity is isolated from the evacuation cavity formed by the mold members when positioned against the outer surfaces of the first and second substrates. The apparatus of this invention also includes a dispensing system for dispensing the cell filling fluid into the cell cavity via a dispensing inlet for communicating with the cell cavity, and a vacuum system for reducing a pressure in each of the cell cavity and the evacuation cavity. In addition, the apparatus may include means to apply pressure to the evacuation cavity. In such a case the apparatus will also include means, such as clamps, latches, hydraulic or pneumatic pistons, to keep the mold members positioned against the outer surfaces of the substrates when the evacuation cavity is pressurized. The means for isolating the cell cavity from the evacuation cavities are varied, but include, for example, the use of isolating seals such as o-rings, gaskets, sealants and the like. Another means of isolating the cell cavity includes placing the dispensing inlet at a position outside the evacuation cavities, e.g., in the seal of the cell when the seal is not encompassed by an evacuation cavity. Preferably, the apparatus of this invention includes two mold members which form two evacuation cavities encompassing at least a portion of each of the first substrate and the second substrate. More preferably, the portion of each substrate encompassed by the respective evacuation cavity is substantially equivalent to the area of each substrate defined by the seal separating the substrates.

A preferred embodiment of the apparatus of this invention for filling a cell cavity with a cell filling fluid is an apparatus comprising:

(a) a first member for forming a first evacuation cavity between at least a portion of an outer surface of the first substrate and at least a portion of the first member, the first member having a first pressure control orifice for communicating with the first evacuation cavity;

(b) a second member for forming a second evacuation cavity between at least a portion of an outer surface of the second substrate and at least a portion of the second member, the second member having a second pressure control orifice for communicating with the second evacuation cavity;

(c) a dispensing system for dispensing the cell filling fluid into the cell cavity via a dispensing inlet for communicating with the cell cavity; and (d) a vacuum system for reducing a pressure in each of (i) the cell cavity via an evacuation outlet for communicating with the cell cavity, (ii) the first evacuation cavity via the first pressure control orifice and (iii) the second evacuation cavity via the second pressure control orifice.

The preferred apparatus of this invention further comprises a pressurizing system for increasing a pressure in each of the first evacuation cavity and the second evacuation cavity. The pressurizing system may increase the pressure in each evacuation cavity by pressurization through the first and second pressure control orifices or through different pressure control orifices, if desired.

Preferably the dispensing inlet and the evacuation outlet are a part of the first member. In this case, the first member will also include isolating seals to isolate the first evacuation cavity from the cell cavity. The first and second members preferably include cavity seals disposed thereon which are located at a perimeter of each of the first evacuation cavity and the second evacuation cavity that are desired to be formed. It is also possible to include heating means in either or both of the first or second members to apply heat to the cell cavity if desired.

Still yet another embodiment of this invention is directed to an apparatus for filling a cell cavity positioned between a first substrate and a second substrate with a cell filling fluid in which the apparatus comprises: (a) a first support member for alignment against at least a portion of an outer surface of the first substrate; (b) a second support member for alignment against at least a portion of an outer surface of the second substrate; (c) means for maintaining a pressure of the first and second support members against the respective first and second substrates; and a dispensing system for dispensing the cell filling fluid in the cell cavity. Typical means for maintaining a pressure include, for example, clamps, latches, hydraulic or pneumatic pistons and the like. The dispensing inlet may be positioned in either support member or if desired in a seal of the cell which separates the first and second substrates to form the cell cavity.

The apparatus embodiments of this invention may be advantageously employed to prepare large area cells and laminated glazings, including large area electrochromic devices which can be used for architectural and automotive glazings.

BRIEF DESCRIPTION OF THE DRAWINGS

By way of example, an embodiment of the above described invention is described in more detail hereinafter with reference to the following drawings. These Figures are only schematic and are not drawn to scale.

FIGS. 4A and 4B show a cross section of each of the mold members along the sections indicated in FIGS. 3A and 3B, respectively.

FIGS. 8A and 8B show two cross sectional views along sections 8A—8A of FIG. 7A and 8B—8B of FIG. 7B, respectively.

FIGS. 9A and 9B show two cross sectional views along sections 9A—9A of FIG. 7A and 9B—9B of FIG. 7B, respectively.

FIG. 10 shows an elevational view of mold members attached to clamping plates or mold bases.

DETAILED DESCRIPTION OF THE INVENTION

This invention describes a method and an apparatus that may be used to fill large area cells with a fluid. Air and moisture sensitive liquids can also be processed by this method. Significantly, the method of this invention may be used in a high volume manufacturing process. Moreover, if desired, the filled liquid can be converted into a solid, for example, by cooling, physical gelation or by a polymerization process such as described in European Patent Application Publication No. 0612826A1, the disclosure of which is incorporated herein by reference.

It is also possible to employ a solid or highly viscous cell filling material by heating the material to reduce the viscosity or render the solid material matter to form a cell filling fluid for use in the present invention. After filling, such a cell filling fluid can be cooled or allowed to cool to result in a cell cavity containing the highly viscous or solid cell filling material.

The laminate or cell filled by the method of this invention is fabricated to create an empty cavity with a predetermined spacing. Such cell fabrication is well known to those of ordinary skill in the art, such as disclosed, for example, in U.S. Pat. No. 5,142,407 and U.S. Pat. No. 5,151,816, the disclosure of each being incorporated by reference herein. The spacing is controlled by thickness of the edge seal. For very large-area cavities it may be desirable to sprinkle spacers, such as microbodies over the entire cavity area and/or include microbodies in the filling fluid. Typically, two holes are made into this cell, preferably close to the two ends of the cell diagonal. These holes can be in the seals or they may be made through the substrates. For the latter it is typically preferred to start cell fabrication with pre-drilled substrates.

Figure 1A:
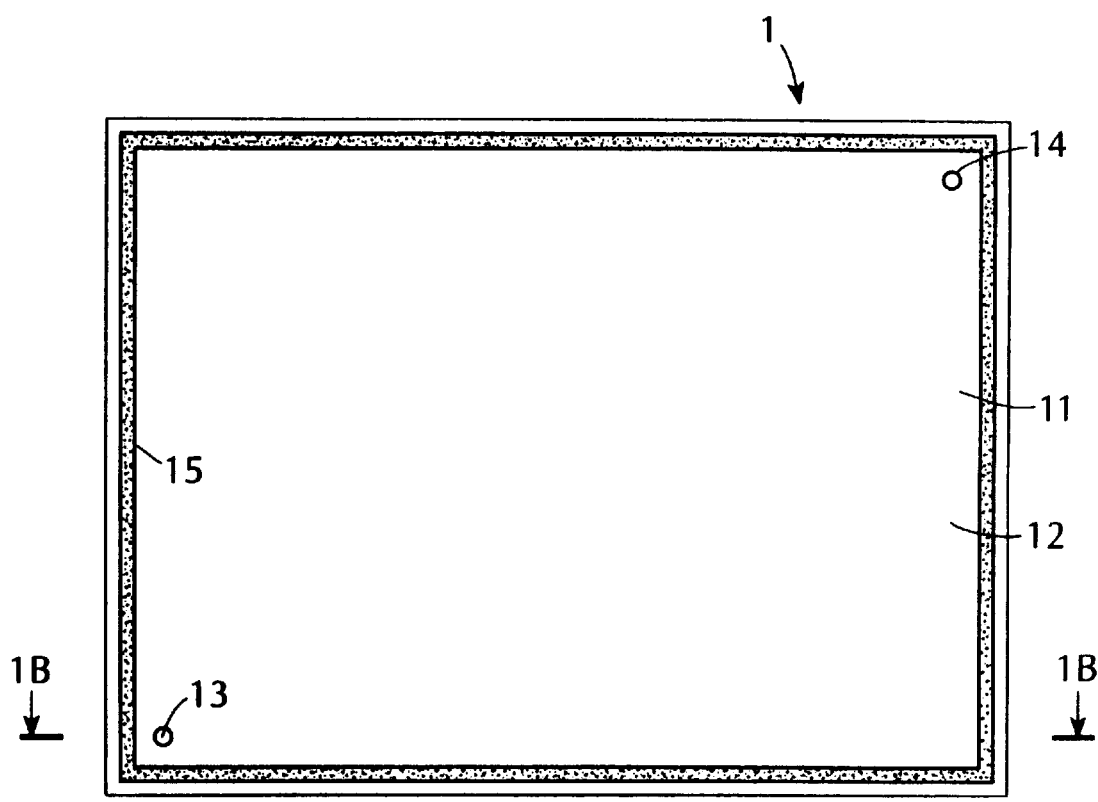
FIGS. 1A and 1B are a plan view and a cross section, respectively, of a typical cell to be filled.
Figure 1B:
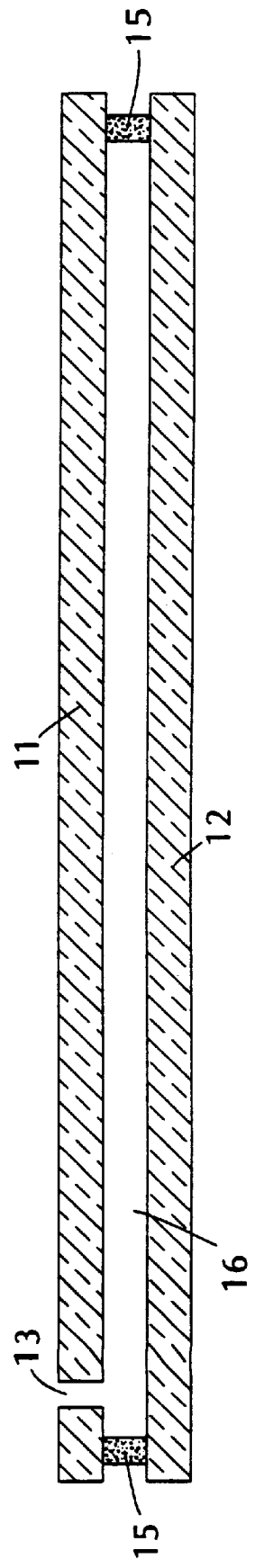

FIGS. 1A and 1B illustrate the construction of a typical cell 1 to be filled by the method of this invention. This cell is composed of two flat plates 11 and 12 and with two holes 13 and 14 drilled near opposite corners of plate 11. These plates are held together by a sealant 15 disposed around the perimeter of the cell. The sealant also acts as a spacer, that determines the thickness of the cell cavity 16. This illustrated cell has a constant cavity thickness.

The cell substrates can be made out of any material such as, for example, plastic, glass and metals. The cell could be made from substrates that are curved (including compound curvature) and/or the cell gap could also vary. The holes shown in plate 11 could also have been placed in plate 12, or one in each of the substrates or in the seals and so forth.

Transmissive electrochromic (EC) devices, for example, may utilize glass substrates which have conductive coatings or conductive mesh disposed on the inner surfaces of the cell. Depending on the type of device there may be more coatings on one or both of these conductive surfaces. Examples of such cells include, for example, transmissive EC panels, reflective EC devices and displays, large area architectural panels, automotive glazing panels and the like.

The fabricated cell, such as illustrated in FIGS. 1A and 1B, is then placed in a mold comprised of at least two members on the filling apparatus and, the pressure is reduced simultaneously both inside the cell and outside of it. As noted previously, the inside of the cell is isolated from the outside of the cell so that fluid dispensed into the cell does not spread to the outside of the cell. This can be accomplished for example through the use of isolating seal means such as o-rings, gaskets and the like. During the evacuation process it is desirable to keep similar reduced pressures inside and outside the cell. This minimizes any bowing of the substrates which reduces the stress on the substrate, edge seals and on the coating which may be deposited on the substrates. The mold is also designed to keep the substrate bowing, if any, to a minimum (e.g., substrate bowing may be corrected by pressurizing the outside surfaces of the cell.) The fluid is then introduced through one of the holes in the substrate. Due to the vacuum or a reduced pressure inside the cavity, the fluid travels quickly through the cell. Since air has been evacuated from the chamber, air sensitive liquids can be utilized. After filling, the cell is removed and the holes are capped. The method of this invention can also be used if the cavity needs to be filled with a gas rather than a liquid.

Any reduction in pressure that is effective to assist the transfer of the filling fluid to the cell cavity may be employed in the method of this invention. Preferably, the pressure is reduced to a range of about 10 inches of mercury ($34 \times 10^3$ pascal) to about 30 inches of mercury ($101 \times 10^3$ pascal).

The fluid used in the method of this invention includes liquids and gases, most preferably viscous liquids. The method and apparatus of this invention are particularly advantageous for filling cell cavities with fluids having a viscosity up to about 10,000 cps, typically liquids having a viscosity in a range of about 50 cps to about 10,000 cps.

Examples of filling fluids that may be employed in the method of this invention include, without limitation, gases, alcohols, organic and inorganic solvents, polymeric melts and electrolytes. The electrolytes may be a mixture of solvents, dissociable salts and redox active materials, as well as additives such as tinting materials, UV stabilizers/absorbers, heat stabilizers, infrared absorbing dyes, spacers, moisture scavengers, infrared absorbing dyes, fillers, plasticizers, viscosity modifiers, gelation materials monomers, polymerization catalysts and initiators and the like.

Preferably, in a high volume manufacturing set up, an apparatus comprising a rigid mold is designed in which the empty cell is placed. For a flat cell made from parallel aligned substrates with a uniform thickness cavity, the mold will typically consist of two halves that have parallel faces. When the mold closes, it grips on to the cell typically from near the sealant line or the edges and forms two additional thin evacuation cavities; one each on both sides of the cell. Preferably, the size of these cavities is similar to the cavity size of the cell. However, to practice this invention it is not essential to keep the cavities similar in size or in shape. Similar cavity shapes and sizes permit an even evacuation rate in all the cavities, and thus similar vacuum or reduced pressure levels without any elaborate control mechanism. These cavities may even be connected to the same vacuum pump with similar tubing, which will further simplify the evacuation process control. Of course, the vacuum system may include separate vacuum pumps for each cavity to be evacuated if desired. Generally, the interpane thickness of the cells filled by the method or apparatus of this invention have a thickness in the range from about 10 $\mu$m to about 2000 $\mu$m, preferably 50 $\mu$m to 500 $\mu$m. However, the method or apparatus of this invention may be employed to fill a cell having any interpane thickness so long as the pressure can be reduced in the cell cavity. For typical laminated glazing, the interpane thickness (cavity thickness) is less than 1000 $\mu$m. Since preferably, the cavities in the mold are of similar dimensions, the size of the total volume to be evacuated can be quite small. Thus large area cells can be processed with small vacuum equipment, such as a mechanical pump, and evacuated rapidly. In addition, the thickness of the mold cavity may restrict the bowing of the cell. The fluid is then introduced through one of the holes to fill the cell cavity.

Figure 2A:
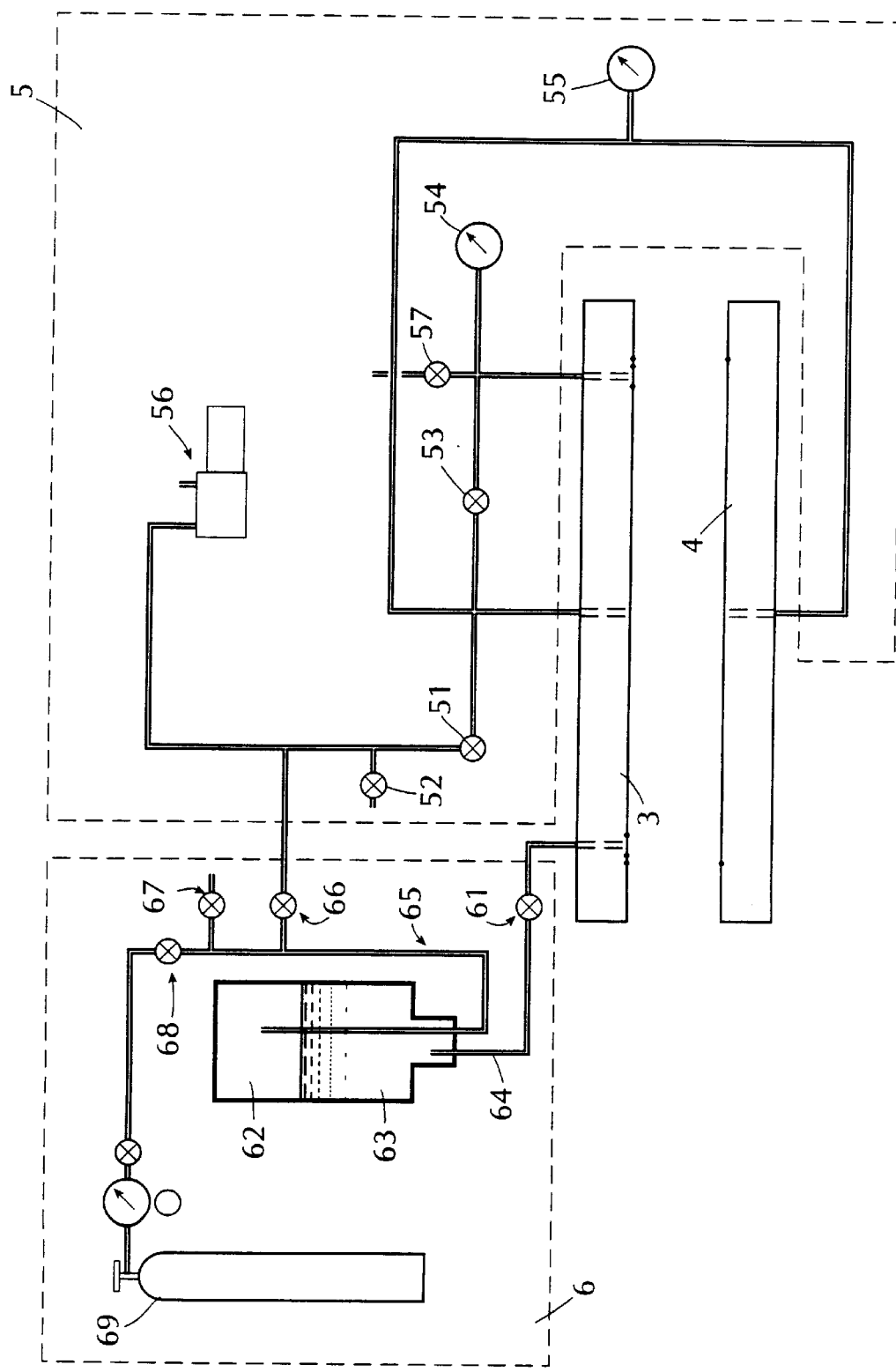
FIGS. 2A and 2B are schematics of examples of the apparatus of this invention that can be used to fill cells according to this invention.
Figure 3A:
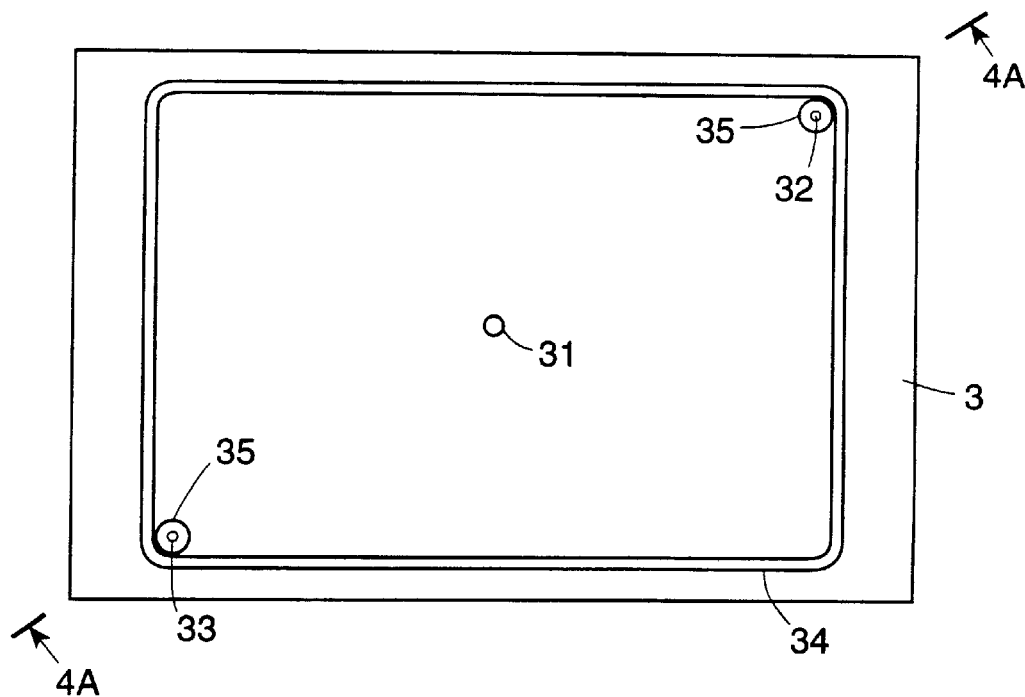
FIGS. 3A and 3B are plan views of the mold members that were shown in FIG. 2A.
Figure 3B:
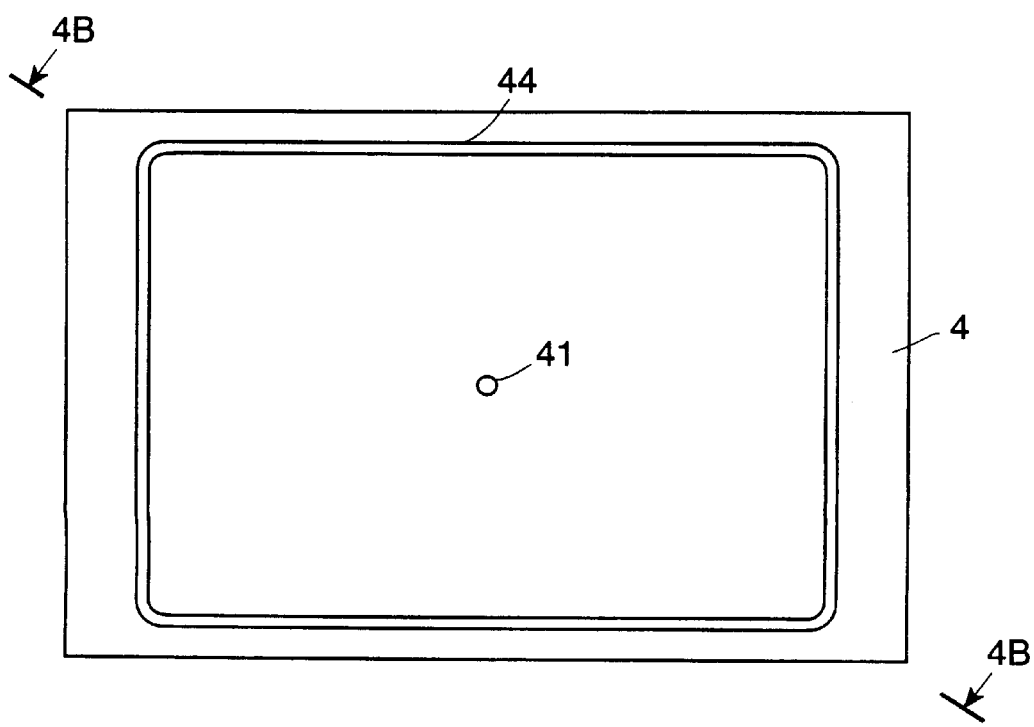

An exemplary apparatus of this invention is shown in FIG. 2A. It comprises two members 3 and 4 which form the mold, a vacuum system 5 and a fluid dispensing system 6. FIGS. 3A, 3B, 4A and 4B show the members in more detail. These members are shown to be conformal to the external size and shape of the cell shown in FIGS. 1A and 1B. These mold members are rigid and strong enough to withstand preferably up to 1 atmosphere of pressure difference with minimum bending. The mold members are preferably made of a corrosion resistant material such as, for example, stainless steel or aluminum alloy. However, any material may be employed that provides mold members having the appropriate rigidity and strength to function in the apparatus of this invention. In the apparatus, the mold members are positioned to face one another and the cell is located between them. FIG. 3A shows the first member, i.e., upper mold member 3 and FIG. 3B shows the second member, i.e., lower mold member 4. The embodiment described herein shows a horizontal arrangement but the basic principles apply for any orientation. FIG. 4 shows a cut out of the diagonal section of the mold along the lines 4A—4A and 4B—4B indicated in FIGS. 3A and 3B, respectively. Each member has a pressure reduction orifice 31 and 41, to be connected to a vacuum system (e.g., a mechanical pump). Holes, i.e., evacuation outlet 32 and dispensing inlet 33 in the first member 3 are aligned with the cell holes 13 and 14. The members have also grooves 34 and 44 matching the position of the cell sealant 15 for accommodating a cavity seal (not shown) to create an evacuation cavity when the mold member is pressed against the substrate. Grooves 35 are situated around the evacuation outlet 32 and dispensing inlet 33, such that isolating seals (not shown), e.g., an o-ring or a gasket can be inserted almost completely to provide means to isolate the cell cavity from the evacuation cavities formed when the mold members are pressed against the surface of the substrates 11 and 12. These mold members, will seat on the top and bottom substrates of the cell, independently or by means of a hinge, guides, etc. not shown in the Figures. FIG. 4A also shows carvings 36 in the mold members to accommodate valves, fittings, etc. as close as possible to the cell holes. It may even be desirable to integrate the valves in the body of the mold members to locate them even closer to the cell. The surface of the mold members facing the cell may be patterned for a more efficient production of vacuum.

Flat heating elements may be placed on the inner surfaces of mold members 3 and 4. In addition, heat insulating members may be inserted between the heaters and the mold members to keep the mold members from becoming excessively hot. It may also be desirable to incorporate cooling channels in the body of the mold members 3 and 4.

When the cell is enclosed in the mold (FIG. 5) three cavities are formed: cell cavity 16, and the first evacuation cavity 71 and the second evacuation cavity 72 defined by the cell and the mold members spaced by the cavity seals 73, e.g., o-rings, gaskets, an oil film, grease or a silicone adhesive. The cell cavity 16 is isolated from the first evacuation cavity 71 and the second evacuation cavity 72 by the isolating seals 74.

Evacuation outlet 32, first pressure reduction orifice 31 and second pressure reduction orifice 41 are connected to the vacuum system and dispensing inlet 33 to a dispensing system containing the filling fluid. A simple dispensing system 6 is shown in FIG. 2A. It consists of a sealed bottle 62 containing the fluid 63. A tubing 64 transports the fluid to the cell through valve 61. Another tubing 65 connects the upper part of the bottle to the vacuum pump 56 or to a pressurized gas container 69 or directly to atmosphere through valves 66, 67 and 68. When only valve 66 is opened to the vacuum, the liquid can be degassed. When only valve 67 is opened, the liquid is vented to the atmosphere and the air pressure can be used to drive the liquid into the cell. This option is suitable for liquids that are air insensitive. When only valve 68 is opened, the liquid can be vented to a controlled atmosphere such as inert gas; the pressure of this gas pumps the fluid into the cell.

By making vacuum i.e., reducing the pressure, simultaneously on the three cavities, any bowing of the cell or any contact between the cell substrates is avoided and the cell can be maintained under vacuum isolated from the filling fluid by valve 61. As the volume of the cavities is generally small, evacuating the cell for any purpose is fast and readily adaptable in a manufacturing process. Furthermore, the mold surfaces facing the cell may restrict the bowing of the cell substrates.

An exemplary layout of valves and pressure gauges is shown in FIG. 2A. Valve 51 connects the vacuum pump 56 with the machine. Valve 52 can be used as a relief valve or as a way of controlling the pumping speed. With valve 61 closed and valves 53 and 51 open, the three chambers are connected to the vacuum system simultaneously. If desired, manometers 54 and 55 can be used to measure the pressure in the cell line and in the cell-block chamber line. The length and size of the tubing, the incorporation of flow restrictors, and similar devices, as well as the position of the unions, can be changed to match the pumping speeds on each chamber as required. After evacuation, valve 61 is opened to allow the liquid to fill the cell.

Figure 2B:
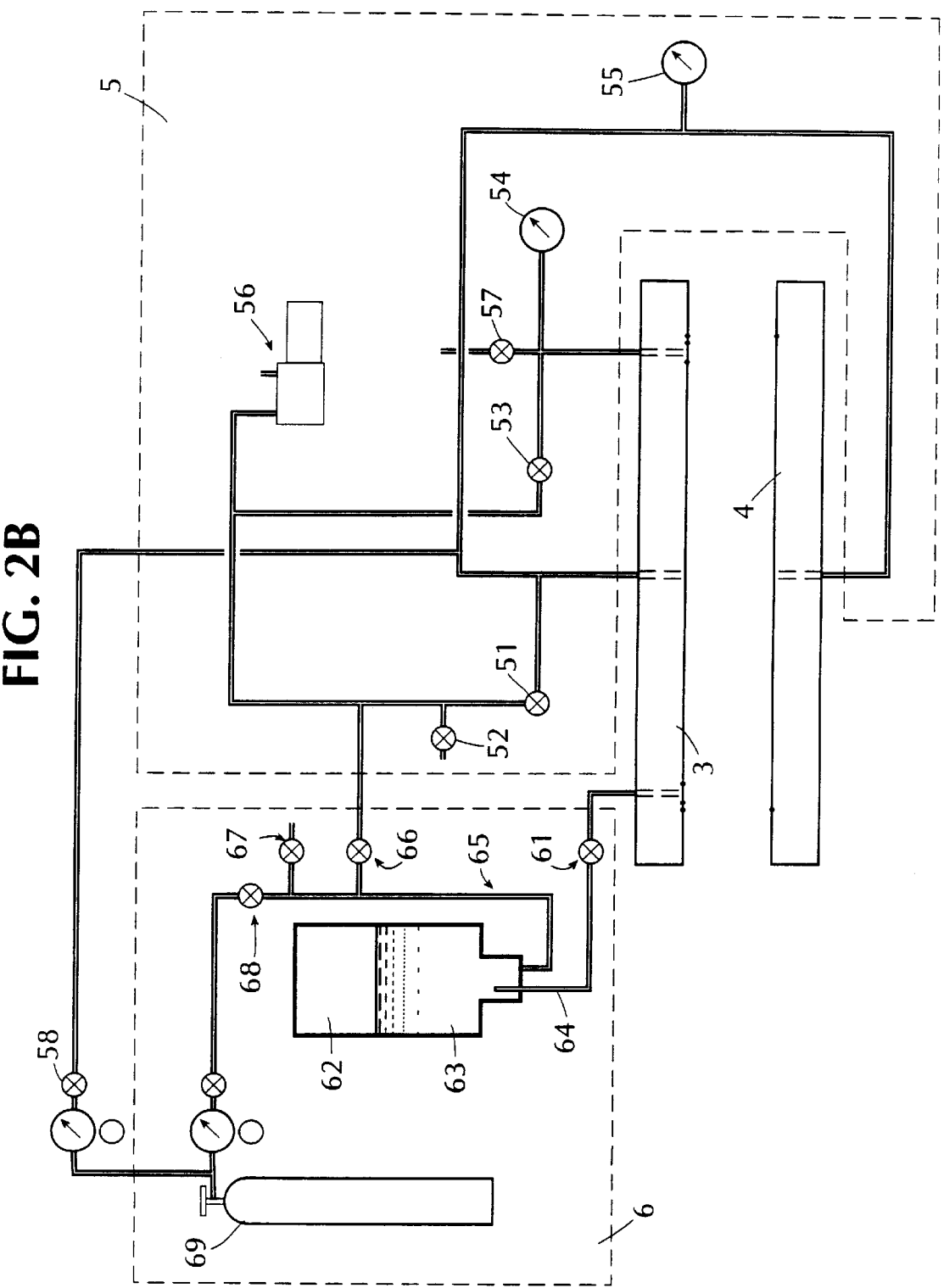

FIG. 2B is an illustration of an apparatus similar to FIG. 2A, except the apparatus includes a pressurization system for pressurizing the evacuation cavities by opening valve 58 and closing valve 51 so as to apply pressure on the outer surface of the substrate walls of the cells. With this arrangement, the cell chamber may be vented through vent 57 or maintained under vacuum while simultaneously applying pressure on the outer cavities. Such a pressurization system may be desirable to reduce the outward bowing of the cell which may be caused when the filling fluid is introduced to the cell cavity under pressure.

Figure 6A:
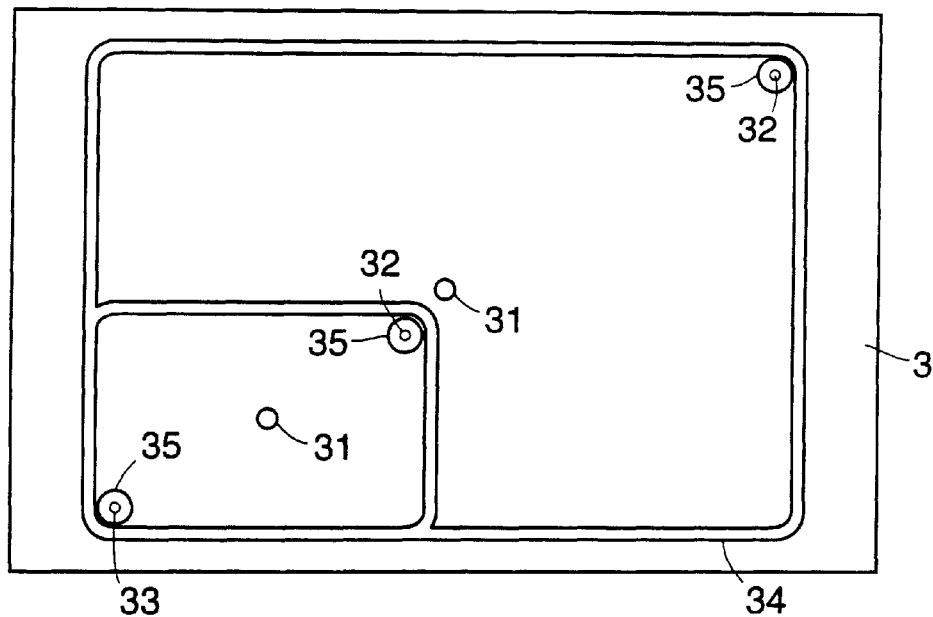
FIGS. 6A and 6B show respective halves of a mold design that can accommodate different sizes of the cell in the same mold.
Figure 6B:
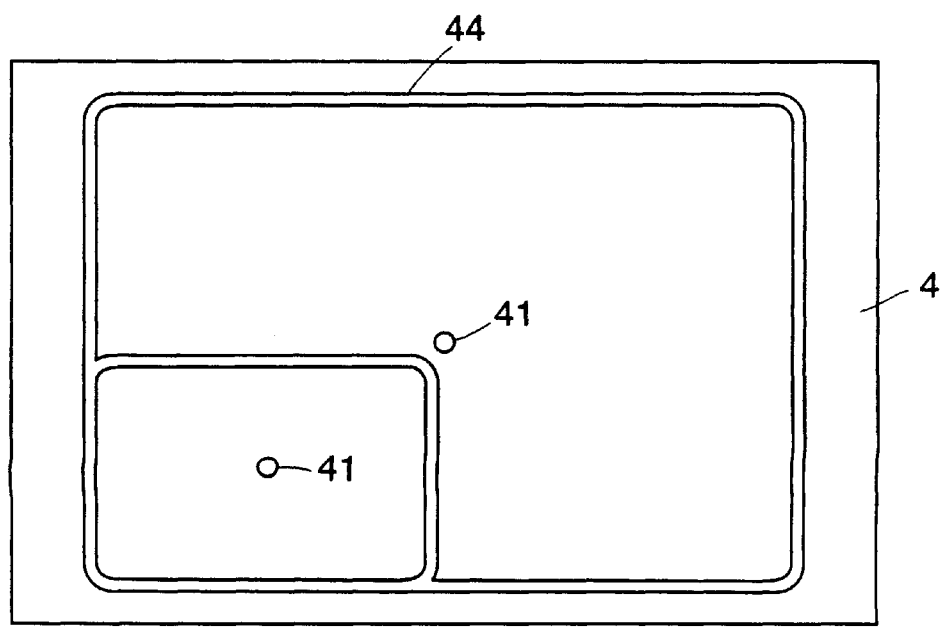

There are many variations to process liquids and cells with different characteristics. For example, during the filling process valve 53 could be left open to continue to evacuate liquids from the fill liquid or it could be in the closed position. This valve may even be open periodically for venting or to obtain other desirable flow characteristics. An example of this is to open this valve for a short duration at the end of the fill process to evacuate any trapped vapors that may result in cosmetic defects. Also valve 57 allows the excess filling material to flow out. Tilting of the entire assembly can help evacuate any gas or vapor pockets that may have been trapped. If opaque materials are used for making the mold members, one can fit windows in the mold, to visually observe the trapped bubbles and observe the flow front, if desired. Other optical systems or visual observation methods may be included in the mold members to monitor the fill or the fluid front progress in the cell cavity. FIGS. 6A and 6B show two mold members 3 and 4 designed so that they can fit two different sizes of cells. The extension to more sizes or shapes is obvious. The evacuation cavity may also be used to apply pressure after the cell is partially and/or completely filled. This pressure may be needed to counter the bulging of the cell substrates if the electrolyte is forced into the cavity under high fluid pressure such as when filling cells with highly viscous electrolytes. The bulging of the substrates can be monitored by mechanical, electrical or optical methods, such as by employing linear variable differential transducers (LVDT) in one or both of the evacuation cavities. The signal generated by such a transducer could be used to activate an automatic feedback control system that will pressurize the evacuation cavities to keep such bowing within a desired level.

Yet another manner of preparing different size cells on the same apparatus is illustrated in FIG. 10. FIG. 10 shows two mold members 3 and 4 attached to clamping plates or mold bases 80 and 81, respectively. In such as case, the cell filling material may be injected at the fluid inlet 83 and communicated through passage way 82 to the cell filling hole. The fluid inlet 83, although pictured at the center of plate 80, may be located at any desired position of the plate. For example, it may be preferable to locate the fluid inlet at an off-center position to reduce the length and bends in passageway 82. The cell cavity and evacuation cavities may be evacuated through vacuum lines 84 which may be an integral part of mold members 3 and 4. With such an apparatus, different sized mold members can be used for different cell sizes and shapes as needed with interchangeable mold members attached to the clamping plates or mold bases. To protect air sensitive filling materials and to eliminate leakage of the filling material through the space between different members, such as the mold member and mold base or mold member and the cell, O-rings, gaskets, sealants and the like may be used.

Common principles of plastic injection molding and mold design may be employed to varying the apparatus described in FIG. 10. See e.g., Mark, H. F., et al., Encyclopedia of Polymer Science and Engineering, "Injection Molding", Vol. 8, p. 102, 2 ed. John Wiley & Sons, New York (1987). In practicing the present invention, techniques of plastic injection molding are modified to preferably ensure that during processing and while replacing the filled cell with an empty cell that the filling material is not substantially exposed to the ambient atmosphere.

Figure 11A:
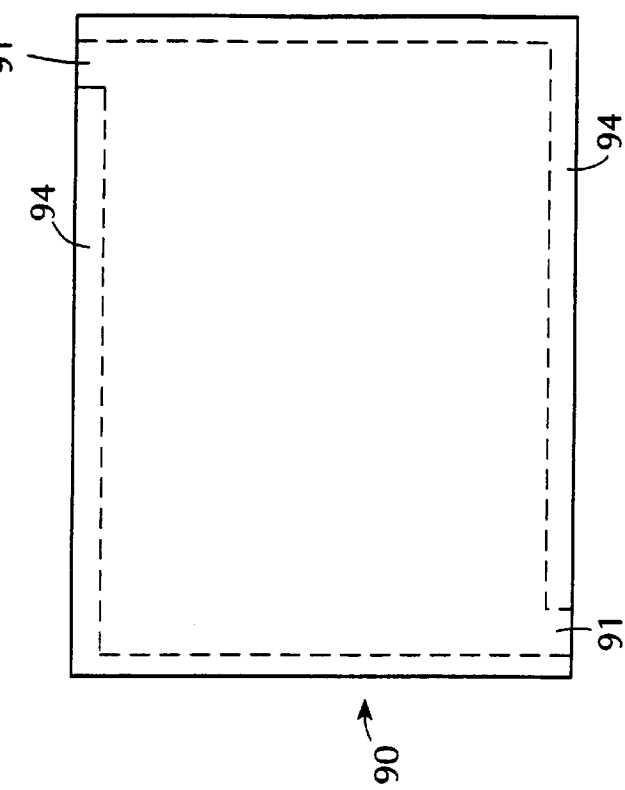
FIG. 11A is a top view of a cell having seal gaps in the cell sealant.
Figure 11B:
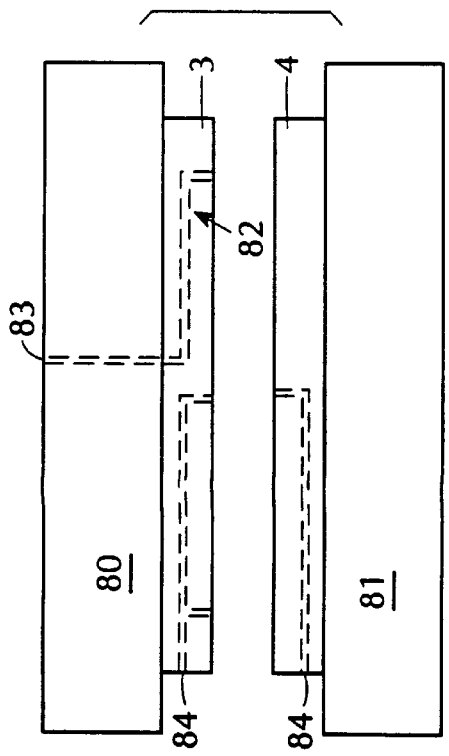
FIG. 11B is a side view of a cell having a cell gap in the cell sealant.

In some instances it may be preferable that the cell filled by this inventive method or apparatus have fill holes which are small gaps in the cell sealant. FIG. 11A illustrates a top view of such a cell 90 having seal gaps 91 in the cell sealant 94. A side view of this cell 90 is shown in FIG. 11B wherein substrates 92 and 93 are separated by cell sealant 94 which has a small seal gap 91 for evacuating and filling the cell.

Figure 12:
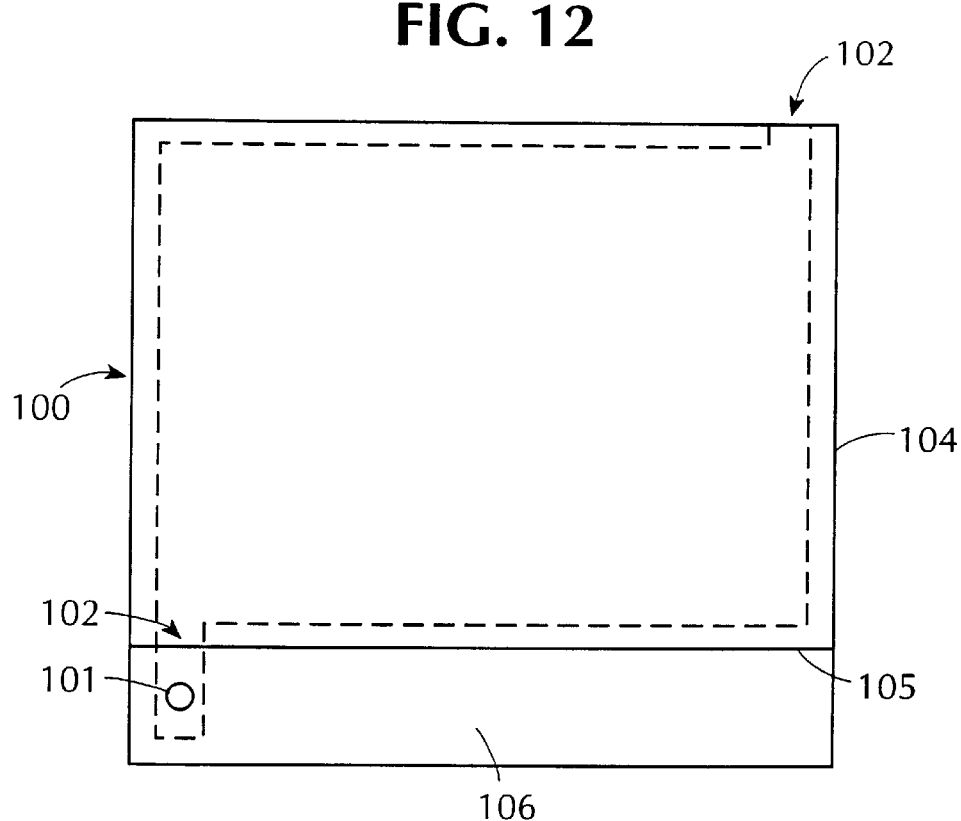
FIG. 12 is a top view of a cell having seal gaps in combination with a cell hole positioned outside the boundary of the finished cell.

FIG. 12 illustrates the use of a cell 100 having seal gaps 102 in combination with at least one cell hole 101 in a substrate 104 wherein the cell hole 103 is aligned outside the boundary 105 of the finished cell. This cell may be filled with cell filling material through cell hole 103, after which the portions 106 outside the boundary 105 that defines the cell is removed and the resulting seal gap 102 is plugged. Of course, a cell could have either one detachable cell hole or two detachable cell holes if desired, e.g., two detachable cell holes that are diagonally opposed.

Figure 13:
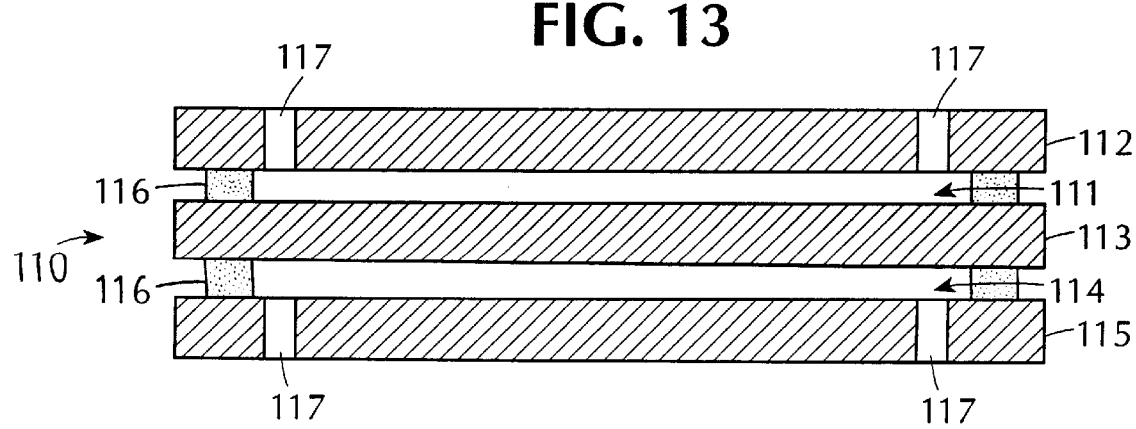
FIG. 13 is a sectional view of a cell having multiple cell cavities.

The present invention may also be employed to fill cells having multiple cell cavities. For example, FIG. 13, illustrates a cell 110 having a first cell cavity 111 disposed between substrates 112 and 113 and a second cell cavity 114 disposed between substrates 115 and 113. The cell cavities are formed by separating each substrate with cell sealant 116. Multiple cavity cells may be filled through cell holes 117 either one cell at a time or simultaneously. Electrochromic devices based on multiple cavity cells are described for example in U.S. Pat. No. 5,076,673.

Figure 7A:
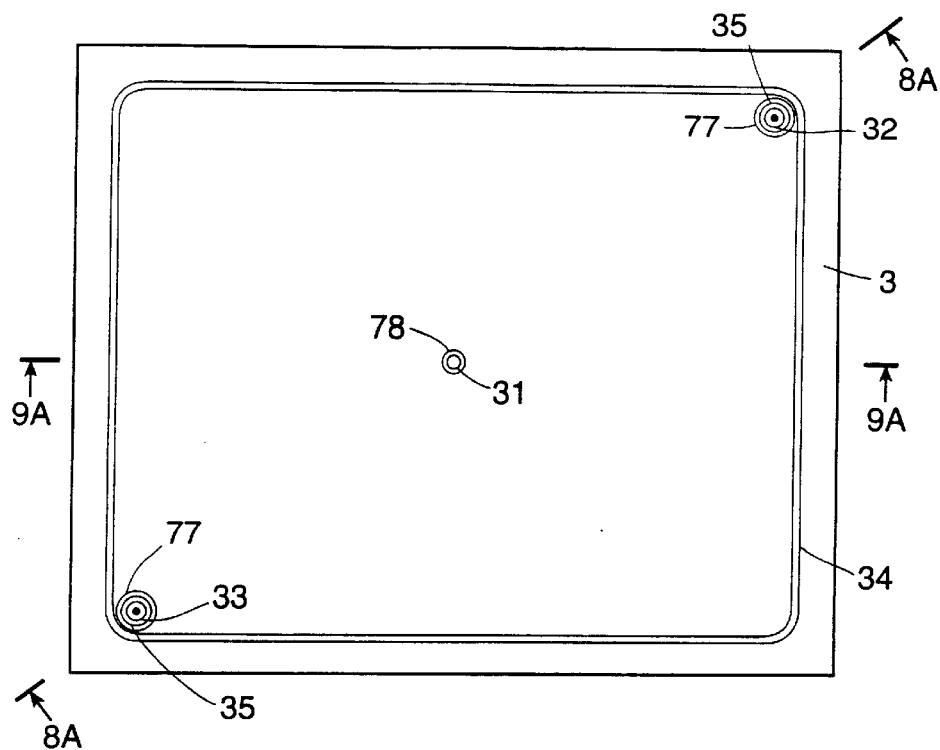
FIGS. 7A and 7B are plan views of mold members that may be used in the apparatus of this invention.
Figure 7B:
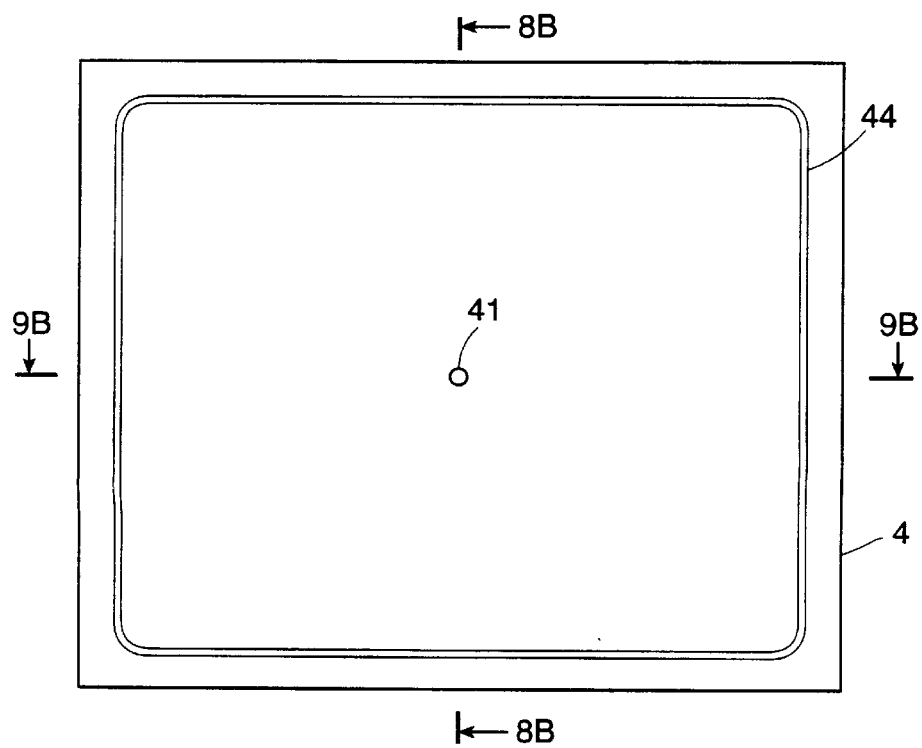

There are many variations that can be made to the apparatus described in the present invention while adhering to the spirit of the invention described above. FIGS. 7A and 7B describe a modification of the mold members 3 and 4 illustrated in FIGS. 3A and 3B. Inserts 77 are located in the inlet port 33 and the outlet port 32. An LVDT transducer 78 is also positioned in the center of the pressure reduction office 31.

FIGS. 8A and 8B shows the details of the mold plates along the sections of 8A—8A of FIG. 7A and 8B—8B of FIG. 7B. The insert 77 is movable in the holes 36 of the first mold member 3. The insert 77 is sealed via O-rings 76. The seal between the cell cavity and the evacuation cavity is formed by the O-rings that are situated in the channels 35. A pressure control orifice 41 is shown in the lower mold member 4. FIGS. 9A and 9B are a sectional views along lines 9A—9A and 9B—9B of FIGS. 7A and 7B, respectively, which shows the pressure control orifice 31 in the mold plate 3 and pressure control orifice 41 in mold plate 4.

This arrangement of the orifices from the sides allows for greater maneuverability of the mold plates during opening and closing. In addition, this also allows the insertion of an LVDT transducer through the top that is centered around the orifice 31.

The apparatus and the mold described in this invention could be automated to any desirable extent to meet production requirements.

The mold members and the fluid dispensing assembly may be heated to process materials that are either frozen or are too viscous to be processed at ambient temperatures. The mold can include appropriate heating elements, sensors and controls to heat the cell. In the case of cell walls with conductive coatings, a current could be passed through them to heat the cell. Yet another embodiment of this invention could comprise two or more molds, where one of them is specially designed to preheat the cell for increasing the throughput rate. It would also be possible to use an apparatus of this invention having several molds on a rotary carousel. In this case, the cells could be loaded in one of the positions and then preheated while another is being filled and yet another filled cell is being sealed or removed, etc. The filling station itself could be multitask station where for example, cell purging, evacuation, filling and plugging will take place sequentially. The method of this invention can be used for cells that are flat or those with curvature (including compound curvature). In addition, the mold can be designed such that different sized cells can be processed on the same tool (mold). The mold opening and closing could be achieved in a number of ways, e.g., pneumatic, hydraulic, mechanical (e.g., toggle mechanism or screw mechanism), etc. The two halves or members of the mold could be mounted on sliding rails, pistons or could be hinged in a C clamp configuration. It is also possible that, the method of this invention may be practiced as an automatic operation with control mechanisms if desired.

If the fluid is a melt or liquid, it may be injected by a screw or a pressure driven plunger type of mechanical device through hot runners and valves if so desired. The cell temperature may be higher than the incoming liquid so that thermal polymerization can be initiated in the molds if desired. The cell may also be pre-injected with inert gases, reactive gases, vapors and/or other liquids to clean the cell, dry the cell, react sites that may be inside the cell, and the like. Some examples of such reactions include: changing the chemical nature of the inner seal surface for improved barrier or chemical properties; improving adhesion promotion of the inner cell surfaces and the liquid that will be filled in the cell and then subsequently solidified; reacting at least one of the coatings that may have been pre-deposed on one of the substrates, such as by reducing or oxidizing it; and so forth.

Sensors can be placed in the molds employed in the apparatus of this invention, to measure such parameters as temperatures, pressure, stress and deformation of cell substrates cavity gap, filling progress, and the like. Sensor outputs may also be fed into a control systems to optimize the filling process.

To obtain rapid and uniform filling, it is not necessary to have only a single fill hole in the cell. Multiple injection holes may be used, and the hole shape need not be circular. The shape can be elliptical, rectangular, trapezoidal, etc., with high aspect ratios. For example, if no sealant is dispensed along one of the edges of the cell, then the entire edge can be used as a gate for fluid filling. Or, on a completely sealed cell, a slot can be made along one side to use with a slot nozzle. It will be readily apparent to one of ordinary skill in the art that the apparatus of this invention can easily be configured or adapted to a cell having multiple fill holes.

To ensure that the filling process advances uniformly through the cavity, localized forces can be applied to the planar cell surface. This can be carried out for example by plungers, piezoelectric tapes and/or pressure membranes that are located in the mold, or by releasing vacuum or pressurizing the outer cavities formed by the mold member to narrow the gap in the center of the cell. If the filling conditions are such that gravity forces influence the dynamics of the fluid motion, the apparatus of this invention can be made such that it is possible to control the spatial orientation of the mold and cell assembly by a tilting mechanism. In that way, some part of the filling process could be conducted at a certain angle and others at a different one. For example, the cell may be loaded horizontally on the apparatus and the filling carried out at an angle or vertically (e.g. with the filling hole at the lower end) and then removed horizontally. This orientation can be fixed or it can change during a process step.

The method of this invention can be adapted for processing laminate glass or other materials, such as for example, architectural and automotive glass. Manufacture of chromogenic glass such as photochromic, thermochromic or electrochromic (EC) panels, filters, mirrors, displays, liquid crystal devices, gas discharge devices, other electrooptical and electrochemical devices (including batteries and sensors), electroarheological and ferrofluids, etc. will also benefit from the method of this invention, particularly for large area devices.

One embodiment of the method of this invention used to make EC devices with the apparatus of this invention is described below. One of the substrates is pre-drilled (before or after depositing the desired films) to provide two holes on the substrate which are preferably diagonal to each other. An empty cell is then fabricated with the coated side of the substrates facing inwards and separated by a predetermined space. The cell so constructed is mounted onto the apparatus and filled with the electrolyte. If any coating used in the device fabrication requires to be reduced, then either the cell can be fabricated by prereducing the coating and then filling as described above or the coating may be reduced in-situ using the apparatus described in this invention. The dispensing inlet which communicates with the cell cavity is connected to the dispensing system which may have several reservoirs connected through a manifold if desired. For example, a first reservoir may contain the reducing solution that is pumped into the cell thus reducing a coating chemically or electrochemically or by a combination of both methods. After reduction is complete, the solution is forced out of the cell by pressurized gas and/or vacuum or by flushing an appropriate liquid contained in a second reservoir. If so desired after flushing, the temperature of the cell could be raised and then filled with a high melting point electrolyte contained in a third reservoir. The cell is then removed from the apparatus and the holes plug sealed. Variations of this method will be apparent to those skilled in the art, e.g. the cell could be cooled, sealed and encapsulated in the mold. It is also possible to insert the electrolyte at a higher pressure to allow for the shrinkage produced by cooling or by further reaction (e.g. crosslinking by radiation or thermal process). The complete process sequence involving automatic valve control, heating and cooling of different elements, pumping steps of liquids with different viscosity, etc. could be monitored and controlled by a microprocessor or a computer by methods known in the industry.

Electrochromic devices that may be prepared by the method of this invention are well known to those skilled in the art. Exemplary electrochromic laminates and devices may be found in U.S. Pat. No. 5,288,433, U.S. Pat. No. 5,244,557 and U.S. Pat. No. 4,761,061, the disclosure of each which is incorporated by reference herein.

Figure 5:
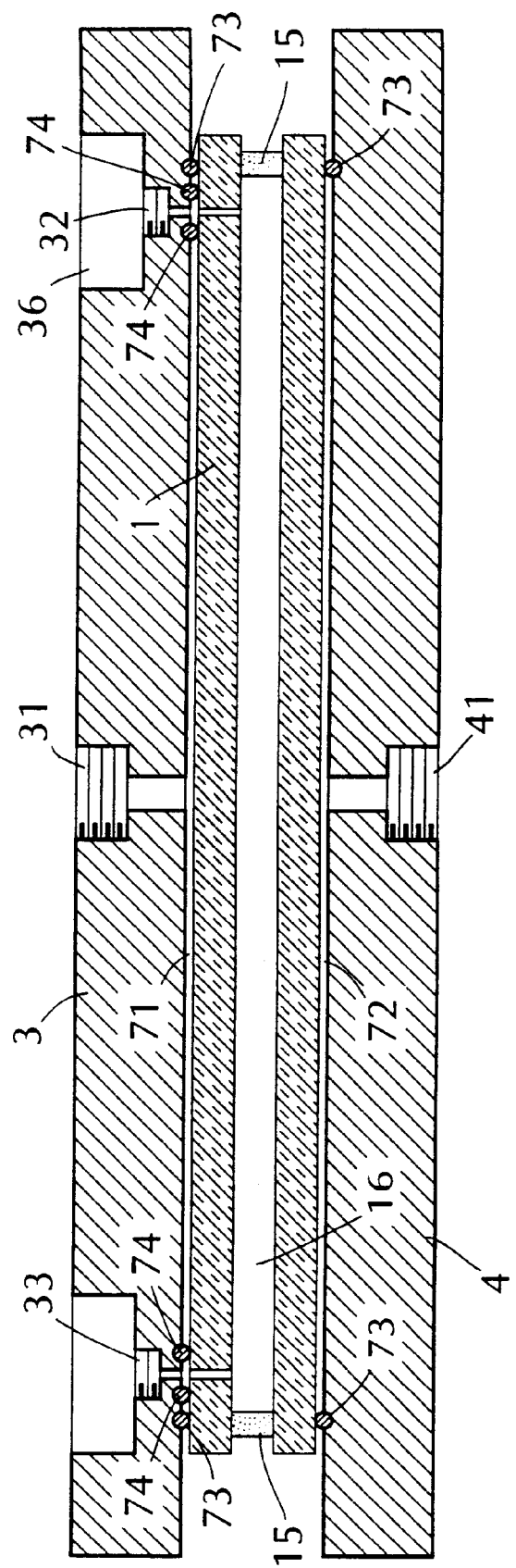
FIG. 5 is a cross section of the mold members and a cell showing their relative positions during filling.

Another embodiment of the apparatus of this invention encompasses an apparatus similar to FIGS. 2 and 2A, with the exception that the mold member 3 and 4 do not employ cavity seals 73, or pressure reduction orifices 31 and 41 as shown in FIG. 5, but instead are used as support members that are aligned with and abutted against the respective first and second substrates of the cell. Thus, this embodiment of the apparatus of the invention does not form evacuation cavities, but instead is used to exert pressure against the substrates of the cell during filling of the cell. The means for applying this pressure include, for example, pneumatic, hydraulic or mechanical mechanisms (e.g. toggle mechanism, clamps or screw mechanisms), all of which can be fashioned without undue experimentation by one of ordinary skill in this art. Yet another embodiment of this invention is directed to the method of filling a cell cavity with a cell fluid using the above-described apparatus.

The Examples which follow are intended as an illustration of certain preferred embodiments of the invention, and no limitation of the invention is implied.

EXAMPLE 1

A cell filling was performed using an apparatus similar to the one described in FIG. 2A. The filler was 30 weight motor oil (viscosity≈190 cps at room temperature).

A glass cell was constructed in the following way: two 12 inch×12 inch square glass plates were cut and two holes were drilled on one of them near two opposite corners. The plates were 0.087 inches thick. They were put together by dispensing an epoxy type sealant mixed with spacers around the edges. After curing the sealant, the cell gap was 210 $\mu$m and the area of the cell cavity was 132 square inches.

The cell described above was then placed in a filling apparatus similar to the one described in FIG. 2A. With valves 61, 66, 67, 57 and 68 closed, vacuum was made with a mechanical pump inside the cell and on the top and bottom cavities by opening valves 51 and 53. After a few seconds, the pressures inside the cell and in the outer cavities were stable and equal to 10 and 15 inches of mercury respectively. Next, valve 67 was opened and finally valve 61 was opened to let the fluid enter the cell. The cell was filled in approximately two minutes. The cell was completely filled with no bubbles.

EXAMPLE 2

An electrochromic cell filling was performed using an apparatus similar to the one described in FIG. 2. The cell was constructed in the following way: a 14 inch×15 inch glass plate with a tin oxide transparent conductive film (TEC 20 available from Libby-Owens Ford, Toledo, Ohio) was coated with a thin film of $WO_3$. Another glass plate with a transparent conductor was cut to the same size and two holes were drilled on it near two opposite corners. The plates were 0.087 inches thick. They were put together with the coatings facing inside by dispensing an epoxy sealant mixed with spacers around the edges. After curing the sealant, the cell gap was 210 $\mu$m and the area of the cell cavity was 132 square inches. An electrolyte was prepared by dissolving $LiClO_4$(0.1 M), $LiBF_4$(0.04 M) and ferrocene (0.05 M) in propylene carbonate.

The cell described above was then placed in the filling apparatus as shown in FIG. 5. Vacuum was made inside the cell and on top and bottom cavities. After a few seconds, the pressures inside the cell and in the outer cavities reached a steady state value of 10 and 15 inches of mercury respectively. Following a valve control sequence similar to the one described in Example 1, the cell was filled with the electrolyte in approximately two minutes. The filler container was positioned approximately 15 cm above the cell. In this case, valve 67 remained closed and valve 68 was open and a pressure of 2 psi was applied to help push the liquid into the cavity. The cell was completely filled with no bubbles. The area around the two holes was cleaned and a silane based primer was applied to this area and then the holes were plugged with a room temperature curable epoxy. After soldering leads to the transparent conductors, a potential difference of 1.2 V was applied to the cell with the negative potential connected to the $WO_3$ coated plate and the cell colored.

EXAMPLE 3

An electrochromic cell filling was performed using an apparatus similar to the one described in FIG. 2b. The cell was constructed in the same way as described in Example 2. The tungsten oxide coating was on the conductive side of TEC 15 (tin oxide coated glass from Libby Owens Ford, Toledo, Ohio) and the other substrate was half wave Indium tin oxide from Donnelly Applied Films, Boulder, Colo. The temperature of the molds was controlled and maintained between 85° C. and 90° C. The cell was preheated in an oven to 85° C. The filling material was a solution of $LiClO_4$ and ferrocene in a mixture of propylene carbonate (PC) and sulfolane in a 6 to 4 ratio by volume. The solution was then thickened by addition of 10 weight % of polymethylmethacrylate. The resulting material had a viscosity of approximately 9,000 cps at 85° C. After degassing the material, it was poured into a plastic cartridge and sealed with a plastic plunger. The cartridge along with the plunger was placed in a metal holder heated to 90° C. This was then connected to inlet 33 shown in FIG. 5. The preheated cell was then placed in the machine between the mold members. A linear variable displacement transducer (LVDT) was inserted through the top member (at the center of the cell) to sense the bowing of the cell walls. Upper and lower set points were selected to trigger solenoid valves 58 and 51 limiting the bowing to the desired level. The electrolyte was forced into the cell cavity by applying a pressure of 10 psi on the cartridge plunger. After the cell was filled, valve 61 was closed. The LVDT indicated that the plates were still bowed due to excess electrolyte. A pressure of 10 to 13 psi was applied in the evacuation chamber to reduce the bowing while forcing the excess electrolyte through valve 57. When the LVDT signal reached a value close to the original one (i.e. indicating elimination of bowing), the cell was removed from the machine and the holes sealed as described in Example 2. After soldering leads to the transparent conductors, a potential difference of 1.4 V was applied to the cell with the negative potential connected to the $WO_3$ coated plate and the cell colored.

EXAMPLE 4

A cell similar to that illustrated in FIG. 12, i.e., having one cell hole in a substrate and a seal gap in the cell sealant, was filled with a thermoplastic electrolyte. The cell was constructed as follows. The first substrate was a rectangular glass plate with a conductive coating of indium tin oxide. A 3 mm diameter hole was drilled near a corner of this substrate to serve as a filling inlet as illustrated in FIG. 12 by cell hole 101. The other substrate, which was coated with tungsten oxide, was cut to the same size as the substrate having the fill hole. Prior to assembly of the cell, the tungsten oxide coated substrate was etched at the perimeter using a 2N NaOH solution by application of the solution to the perimeter with a wipe. Next, copper tape bus bars where applied to both substrates and then insulating tape was applied to cover the copper tape on the tungsten oxide coated substrate. Then resin containing space beads were dispensed as a primary cell sealant onto one of the substrates as shown in FIG. 12. The cell was constructed and the primary cell was then filled with electrolyte without evacuating the cell cavity by sandwiching the cell between two heated plates that were at an elevated temperature of about 65° C. The hole in the cell was aligned with the hole in one of the members. The hole in the member was connected to a heated (65° C.) reservoir containing the electrolyte, the composition of which is described in Example 3. Motorized plungers in the reservoir forced the electrolyte into the passage way of the member leading to the cell hole. After the cell was filled, it was removed from the apparatus and cooled to room temperature. The cell was then scored and the excess glass was removed so the cell resembled that described in FIG. 11. A standard two-part room temperature curing epoxy was used to plug the seal gaps in the primary sealant. The finished cell was approximately 7.75 inches×6.25 inches.

What is claimed is:

1. An apparatus for filling a preformed cell cavity positioned between a first substrate and a second substrate with a cell filling fluid, said apparatus comprising the combination of:
   (a) said preformed cell cavity;
   (b) a first member for forming a first evacuation cavity between at least a portion of an outer surface of said first substrate and at least a portion of said first member, said first member having a first pressure control orifice for communicating with said first evacuation cavity, wherein said portion of said outer surface of said first substrate substantially conforms to a perimeter defined by said preformed cell cavity;
   (c) a second member for forming a second evacuation cavity between at least a portion of an outer surface of said second substrate and at least a portion of said second member, said second member having a second pressure control orifice for communicating with said second evacuation cavity, wherein said portion of said outer surface of said second substrate substantially conforms to said perimeter defined by said preformed cell cavity;
   (d) a dispensing system for dispensing the cell filling fluid into said preformed cell cavity via a dispensing inlet for communicating with said cell cavity;
   (e) a vacuum system for reducing a pressure in each of (i) said cell cavity via an evacuation outlet for communicating with said preformed cell cavity, (ii) said first evacuation cavity via said first pressure control orifice and (iii) said second evacuation cavity via said second pressure control orifice.

2. An apparatus according to claim 1, wherein said dispensing inlet and said evacuation outlet are a part of said first member.

3. An apparatus according to claim 1, wherein said dispensing inlet is a part of said first member and said evacuation outlet is a part of said second member.

4. An apparatus according to claim 1, further comprising a pressurizing system for increasing the pressure in said first evacuation cavity and said second evacuation cavity.

5. An apparatus according to claim 1, further comprising cavity seals disposed on said first member and said second member, said cavity seals located at a perimeter defining each of said first evacuation cavity and said second evacuation cavity.

6. An apparatus according to claim 1, wherein at least one of said first member and said second member is comprised of means for heating said cell.

7. An apparatus for filling a preformed cell cavity positioned between a first substrate and a second substrate with a cell filling fluid, said apparatus comprising the combination of:
   (a) said preformed cell cavity;
   (b) at least two mold members for forming at least one evacuation cavity encompassing at least a portion of an outer surface of each of the first substrate and the second substrate of a preformed cell containing said cell cavity, wherein said portion of said outer surface of each of said first substrate and said second substrate substantially conforms to a perimeter defined by said preformed cell cavity;
   (c) means for isolating said preformed cell cavity from said evacuation cavity;
   (d) a dispensing system for dispensing the cell filling fluid into said preformed cell cavity via a dispensing inlet for communicating with said preformed cell cavity; and
   (e) a vacuum system for reducing a pressure in each of said preformed cell cavity and said evacuation cavity.

8. An apparatus for filling a cell cavity according to claim 7, wherein said apparatus comprises two mold members.

9. An apparatus for filling a cell cavity according to claim 8, wherein said two mold members form two evacuation cavities.

10. An apparatus for filling a cell cavity according to claim 9, wherein one of said two mold members comprise the dispensing inlet.

11. An apparatus for filling a cell cavity according to claim 10, wherein said means for isolating said cell cavity from said evacuation cavity is an isolating seal.

12. An apparatus for filling a cell cavity according to claim 11, wherein said isolating seal is an o-ring or gasket.

13. An apparatus for filling a cell cavity according to claim 7, further comprising a pressurizing system for increasing the pressure in said evacuation cavity.

14. An apparatus for filling a preformed cell cavity positioned between a first substrate and a second substrate with a cell filling fluid, said apparatus comprising the combination of:
   (a) said preformed cell cavity;
   (b) a first support member for alignment against at least a portion of an outer surface of said first substrate;
   (c) a second support member for alignment against at least a portion of an outer surface of said second substrate;
   (d) means for maintaining a pressure of the first and second support members against the respective first and second substrates; and
   (e) a dispensing system for dispensing the cell filling fluid into said preformed cell cavity via a dispensing inlet for communicating with said preformed cell cavity.

15. An apparatus according to claim 14, wherein at least one of said first support member and said second support member is comprised of means for heating the cell.

16. An apparatus according to claim 14, wherein said dispensing inlet is part of said first support member.

* * * * *

UNITED STATES PATENT AND TRADEMARK OFFICE
CERTIFICATE OF CORRECTION

PATENT NO.    : 6,203,304 B1
DATED         : March 20, 2001
INVENTOR(S)   : Juan C. Lopez Tonazzi et al.

It is certified that error appears in the above-identified patent and that said Letters Patent is hereby corrected as shown below:

Column 1,
Line 65, "example" should read -- example, --.

Column 2,
Line 19, "subjected to," should read -- subjected, --;
Line 27, "are" should read -- is --;
Line 33, "p" should read -- P --; and
Line 58, "so as" should read -- as --.

Column 5,
Line 54, "matter" should read -- fluid --.

Column 8,
Line 7, "o-ring" should read -- O-ring --; and
Line 31, "o-rings," should read -- O-rings, --.

Column 10,
Line 58, "a" should be deleted.

Column 16,
Line 34, "comprise" should read -- comprises --.

Signed and Sealed this

Ninth Day of April, 2002

*Attest:*

JAMES E. ROGAN
*Attesting Officer*        *Director of the United States Patent and Trademark Office*